United States Patent
Weise

(10) Patent No.: US 6,275,791 B1
(45) Date of Patent: Aug. 14, 2001

(54) NATURAL LANGUAGE PARSER

(76) Inventor: David N. Weise, 232 Waverly Way, Kirkland, WA (US) 98033

(*) Notice: Subject to any disclaimer, the term of this patent is extended or adjusted under 35 U.S.C. 154(b) by 0 days.

(21) Appl. No.: 09/261,596

(22) Filed: Feb. 26, 1999

(51) Int. Cl.[7] .................................................. G06F 17/27
(52) U.S. Cl. .................................................. 704/9
(58) Field of Search ................. 704/1, 9, 10, 2, 704/7, 251, 252, 254, 255, 257; 707/530, 531, 532, 534

(56) References Cited

U.S. PATENT DOCUMENTS

| | | | |
|---|---|---|---|
| 4,887,212 | * 12/1989 | Zamora et al. | 704/9 |
| 5,434,978 | 7/1995 | Docker et al. | 709/230 |
| 5,740,425 | 4/1998 | Povilus | 707/100 |
| 5,946,648 | 8/1999 | Halstead, Jr. et al. | 704/9 |
| 5,960,384 | * 9/1999 | Brash | 704/9 |
| 5,963,893 | 10/1999 | Halstead, Jr. et al. | 704/9 |
| 5,963,894 | * 10/1999 | Richardson et al. | 704/9 |
| 5,999,896 | * 12/1999 | Richardson et al. | 704/9 |
| 6,016,467 | 1/2000 | Newated et al. | 704/9 |

FOREIGN PATENT DOCUMENTS 410301596A   4/1997   (JP).

* cited by examiner

*Primary Examiner*—Patrick N. Edouard

(57) ABSTRACT

An improved natural language parser uses a template set to identify predefined parse conditions and to implement responsive actions, thus reducing processing time while increasing parse tree accuracy. The template set is used to identify predefined conditions of the current parse state, an input span, and the history of the parse process. Once a template has been matched, the improved parser implements associated responsive actions to reduce the parse time typically associated with parsing an input span under the identified conditions. This on-the-fly implementation of responsive actions permits the parser to focus the parse process on the portions of the input span most likely to generate the complete and accurate parse in the shortest amount of time.

36 Claims, 14 Drawing Sheets input span: "Who did John say kissed Mary?"

NODE CHART (204)

| Node | Label |
|---|---|
| 206a | Who - N |
| 206b | did - V |
| 206c | John - N |
| 206d | say - V |
| 206e | Kissed - V |
| 206f | Mary - N |
| 206g | Who - NP1 |
| 206h | did - VP1 |
| 206i | John - NP2 |
| 206j | say - VP2 |
| 206k | kissed - VP3 |
| 206l | Mary - NP3 |
| 206m | kissed Mary - VP4 |
| 206n | did John - VP5 |
| 206o | Who did John - VP6 |
| 206p | Who did - VP7 |
| 206q | John say - VP8 |
| 206r | say kissed Mary - VP9 |
| 206s | John say kissed Mary - VP10 |
| 206t | did John say kissed Mary - VP11 |
| 206u | Who did John say kissed Mary - VP12 |

CANDIDATE LIST (208)

| GOODNESS MEASURE | NODE |
|---|---|
| $X_1$ | Who - N |
| $X_2$ | did - V |
| $X_3$ | John - N |
| $X_4$ | say - V |
| $X_5$ | kissed - V |
| $X_6$ | Mary - N |
| $X_7$ | Who - NP1 |
| $X_8$ | did - VP1 |
| $X_9$ | John - NP2 |
| $X_{10}$ | say - VP2 |
| $X_{11}$ | kissed - VP3 |
| $X_{12}$ | Mary - NP3 |

FIG. 2

"Who did John say kissed Mary?"

| Promoted Node | Node Goodness | Node Contents | Node Constituents | |
|---|---|---|---|---|
| CHAR1 | 1.00000 | "?" | | ← 554 |
| NOUN1 | 1.00000 | "Mary" | | ← 556 |
| VERB1 | 1.00000 | "kissed" | | |
| VERB2 | 1.00000 | "say" | | |
| NOUN2 | 1.00000 | "John" | | |
| VERB3 | 1.00000 | "did" | | |
| PRON1 | 1.00000 | "Who" | | ← 555 |
| BEGIN1 | 1.00000 | "" | | ← 558 |
| NP1 | 0.99770 | "Who" | PRON1 | |
| VP1 | 0.99770 | "Who" "did" | VERB3 NOUN2 | |
| NP2 | 0.99770 | "John" | VERB2 | |
| VP2 | 0.99770 | "say" | VERB1 | |
| VP3 | 0.99770 | "kissed" | NOUN1 | |
| NP3 | 0.99770 | "Mary" | | ← 560 |
| VP4 | 0.04498 | | VP3 NP3 | |
| PTPRTCL1 | 0.04732 | "did" "John" | VP1 NP1 | |
| VP5 | 0.01294 | "Who" "did John" | VP1 NP1 | NP2 |
| VP6 | 0.01510 | "Who did John" | VP6 VP5 | |
| NREL1 | 0.01419 | | VP4 VP5 | ← 550 |
| COMPCL1 | 0.00923 | "kissed" "Mary" | NP1 VP4 | |
| COMPCL2 | 0.00692 | "kissed" "Mary" | NP1 VP2 | |
| VP7 | 0.00318 | "did John" "did" | NP2 VP2 | |
| VP8 | 0.00178 | "Who" "did" | NP2 VP1 | |
| VP9 | 0.00093 | "John" "say" | VP1 | |
| VP10 | 0.03837 | "say" "kissed Mary" | VP11 | |
| VP11 | 0.00603 | "did" "John say kissed Mary" | VP10 | |
| COMPCL3 | 0.00354 | "did John say kissed Mary" | NP1 | |
| COMPCL4 | 0.00298 | "John say kissed Mary" | VP1 | ← 552 |
| VP12 | 0.00117 | "Who" "did John say kissed Mary" | VP2 COMPCL1 VP9 VP10 | |
| | | | VP11 | |

FIG. 5

"Who did John say kissed Mary?"

| Promoted Node | Node Goodness | Node Contents | | Node Constituents |
|---|---|---|---|---|
| CHAR1 | 1.00000 | "?" | | |
| NOUN1 | 1.00000 | "Mary" | | |
| VERB1 | 1.00000 | "kissed" | | |
| VERB2 | 1.00000 | "say" | | |
| NOUN2 | 1.00000 | "John" | | |
| VERB3 | 1.00000 | "did" | | |
| PRON1 | 1.00000 | "Who" | | PRON1 |
| BEGIN1 | 1.00000 | " " | | VERB3 |
| NP1 | 0.99770 | "Who" | | NOUN2 |
| VP1 | 0.99770 | "did" | | VERB2 |
| NP2 | 0.99770 | "John" | | VERB1 |
| VP2 | 0.99770 | "say" | | NOUN1 |
| VP3 | 0.99770 | "kissed" | | NP3 |
| NP3 | 0.99770 | "Mary" | | VP3 |
| VP4 | 0.00984 | "kissed Mary" | | VP4 ← 702 |
| PTPRTCL1 | 0.04613 | "kissed Mary" | | VP2 COMPLCL1 ← 718 |
| COMPLCL1 | 0.00698 | "kissed Mary" | | NP2 VP5 |
| VP5 | 0.00021 | "say" "kissed Mary" | | VP1 VP6 |
| VP6 | 0.00159 | "John" "say kissed Mary" | | NP1 VP7 ← 720 |
| VP7 | 0.00116 | "did" "John say kissed Mary" | | |
| VP8 | 0.00061 | "Who" "did John say kissed Mary" | | |

FIG.7

"I jumped when the dog saw the iguana."

| Promoted Node | Node Goodness | Node Contents | Node Constituents |
|---|---|---|---|
| CHAR1 | 1.00000 | "." | |
| NOUN1 | 1.00000 | "iguana" | |
| ADJ1 | 1.00000 | "the" | |
| VERB1 | 1.00000 | "saw" | |
| NOUN2 | 1.00000 | "dog" | |
| ADJ2 | 1.00000 | "the" | |
| CONJ1 | 1.00000 | "when" | |
| VERB2 | 1.00000 | "jumped" | |
| PRON1 | 1.00000 | "I" | |
| BEGIN1 | 1.00000 | "I" | |
| NP1 | 0.99770 | "I" | PRON1 |
| VP1 | 0.99770 | "jumped" | VERB2 |
| CONJP1 | 0.99770 | "when" | CONJ1 |
| AJP1 | 0.99770 | "the" | ADJ2 |
| NP2 | 0.99770 | "the" "dog" | AJP2 NOUN2 |
| VP2 | 0.99770 | "saw" | VERB1 |
| AJP2 | 0.99770 | "the" | ADJ1 |
| NP3 | 0.99770 | "the" "iguana" | AJP1 NOUN1 |
| NP4 | 0.01205 | "dog" | AJP2 |
| VP3 | 0.01698 | "dog" | VP2 |
| VP4 | 0.04699 | "saw" "the iguana" | VP2 NP2 |
| NP5 | 0.06592 | "the dog" | AJP1 |
| VP5 | 0.04634 | "the dog" "saw the iguana" | NP5 |
| SUBCL1 | 0.03126 | "when" "the dog saw the iguana" | CONJP1 VP1 |
| VP6 | 0.00525 | "I" "jumped when the dog saw the iguana" | VP1 NP1 |
| VP7 | 0.02051 | "I" "jumped when the dog saw the iguana" | |

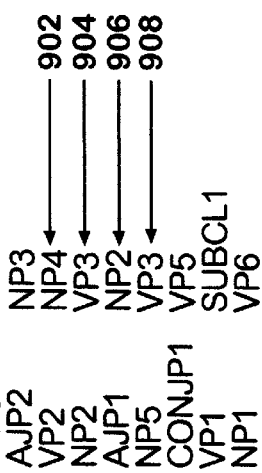

FIG.9

"It was injurious, neutral, or helpful to his cause."

| Promoted Node | Node Goodness | Node Contents | Node Constituents |
|---|---|---|---|
| CHAR1 | 1.00000 | "," | |
| NOUN1 | 1.00000 | "cause" | |
| ADJ1 | 1.00000 | "his" | |
| PREP1 | 1.00000 | "to" | |
| ADJ2 | 1.00000 | "helpful" | |
| CONJ1 | 1.00000 | "or" | |
| CHAR2 | 1.00000 | "," | |
| ADJ3 | 1.00000 | "neutral" | |
| CHAR3 | 1.00000 | "," | |
| ADJ4 | 1.00000 | "injurious" | |
| VERB1 | 1.00000 | "was" | |
| PRON1 | 1.00000 | "It" | |
| BEGIN1 | 1.00000 | "" | |
| NP1 | 0.99770 | | PRON1 |
| VP1 | 0.99770 | | VERB1 |
| AJP1 | 0.99770 | | ADJ4 |
| CONJ2 | 0.99770 | | CHAR3 |
| CONJP1 | 0.99770 | | CONJ2 |
| AJP2 | 0.99770 | | ADJ3 |
| CONJ3 | 0.99770 | | CHAR2 |
| CONJP2 | 0.99770 | | CONJ3 |
| CONJP3 | 0.99770 | | CONJ1 |
| AJP3 | 0.99770 | | ADJ2 |
| PP1 | 0.99770 | | PREP1 |
| AJP4 | 0.99770 | | ADJ1 |
| NP2 | 0.99770 | | NOUN1 |
| NP3 | 0.01205 | | AJP4 |
| PP2 | 0.01091 | "to" "his" "cause" | PP1 |
| AJP5 | 0.00258 | "helpful" "to his cause" | AJP3 |
| AJP6 | 0.00308 | "or" "helpful to his cause" | CONJP3 |
| AJP10 | 0.09397 | "neutral" "," | AJP2 CHAR2 |

FIG.10

"He went to the store quickly."

| Promoted Node | Node Goodness | Node Contents | | Node Constituents |
|---|---|---|---|---|
| CHAR1 | 1.00000 | "." | | PRON1 |
| ADV1 | 1.00000 | "quickly" | | VERB1 |
| NOUN1 | 1.00000 | "store" | | PREP1 |
| ADJ1 | 1.00000 | "the" | | ADJ1 |
| PREP1 | 1.00000 | "to" | | NOUN1 |
| VERB1 | 1.00000 | "went" | | ADV1 |
| PRON1 | 1.00000 | "He" | | AJP1 |
| BEGIN1 | 1.00000 | "" | | PP1 |
| NP1 | 0.99770 | "He" | | VP1 |
| VP1 | 0.99770 | "went" | | VP2 |
| PP1 | 0.99770 | "to" | | |
| AJP1 | 0.99770 | "the" | → 1102 | NP2 |
| NP2 | 0.99770 | "store" | → 1104 | NP3 |
| AVP1 | 0.99770 | "quickly" | → 1106 | PP2 |
| NP3 | 0.03802 | "the" "store" | → 1108 | AVP1 |
| PP2 | 0.03126 | "to" "the store" | → 1110 | |
| VP2 | 0.00849 | "went" "to the store" | | |
| VP3 | 0.00087 | "went to the store" "quickly" | | |

FIG.11

"The very small dog saw the iguana."

| Promoted Node | Node Goodness | Node Contents | Node Constituents |
|---|---|---|---|
| CHAR1 | 1.00000 | | |
| NOUN1 | 1.00000 | | |
| ADJ1 | 1.00000 | | |
| VERB1 | 1.00000 | | |
| NOUN2 | 1.00000 | | |
| ADJ2 | 1.00000 | | |
| ADV1 | 1.00000 | | |
| ADJ3 | 1.00000 | | |
| BEGIN1 | 1.00000 | | |
| AJP1 | 0.99770 | "The" | ADJ3 |
| AVP1 | 0.99770 | "The" | ADV1 |
| AJP2 | 0.99770 | "very" | ADJ2 |
| NP1 | 0.99770 | "dog" | NOUN2 |
| VP1 | 0.99770 | "saw" | VERB1 |
| AJP3 | 0.99770 | "the" | ADJ1 |
| NP2 | 0.99770 | "iguana" | NOUN1 |
| AJP4 | 0.05248 | "very" "small" | AVP1 AJP2 ← 1202 |
| NP3 | 0.01205 | "the" "iguana" | AJP3 NP2 |
| VP2 | 0.01698 | "saw" "the iguana" | VP1 NP3 |
| VP3 | 0.04699 | "dog" "saw the iguana" | NP1 VP2 |
| NP4 | 0.02864 | "very small" "dog" | AJP4 NP1 |
| NP5 | 0.06295 | "The" "very small dog" | AJP1 NP4 |
| VP4 | 0.04634 | "The very small dog" "saw the iguana" | NP5 VP2 ← 1204 |

FIG. 12

GROWTH STAGE

ADJUSTMENT STAGE

NATURAL LANGUAGE PARSER

TECHNICAL FIELD

The present invention relates generally to natural language parsers and more particularly to a method for identifying parse conditions having predefined characteristics and modifying the parsing procedure in response to the identification of such segments.

BACKGROUND OF THE INVENTION

A natural language parser is a program that takes an input span, usually a sentence, of natural language (e.g., English) text as input and produces as output for that span a data structure, usually referred to as a parse tree. This parse tree typically represents the syntactic relationships between the words in the input span. In other words, the parse tree typically represents a sentence-like construction of the input span.

Natural language parsers have traditionally been rule-based. Such rule-based parsers store knowledge about the syntactic structure of the natural language in the form of syntax rules, and apply these rules to the input text span to obtain the resulting parse tree. The parser usually stores information about individual words, such as what parts-of-speech they can represent, in a dictionary or "lexicon". The dictionary or lexicon is accessed by the parser for each word in the input span prior to applying the syntax rules.

To generate a parse tree, a conventional parser first creates one or more leaf nodes for each word of the input span. Each leaf node indicates a possible part of speech of the word. For example, the word "part" can be used as a noun or a verb part-of-speech. A leaf node contains a single word and its associated part of speech. An intermediate-level node contains (i.e., is linked to) one or more leaf nodes as its basic elements and is created by application of a syntax rule. Adjacent nodes are leaf nodes or intermediate-level nodes that are adjacent to one another in the input span. The parser applies the syntax rules to generate intermediate-level nodes linked to one, two, or occasionally more existing nodes. Upon completion of a successful parse, the parser will have generated a single node for a complete syntax parse tree that encompasses an entire input span.

A conventional parser attempts to apply syntax rules one-at-a-time to single nodes, to pairs of nodes, and, occasionally, to larger groups of nodes. If, for example, a syntax rule specifies that two certain types of nodes can be combined into a new intermediate-level node and a pair of adjacent nodes match that specification, then the parser applies the syntax rule to the adjacent nodes to create the new node representing the syntactic construct of the rule.

A typical parser uses a node chart data structure to track the nodes that have been created. Each node is represented by a record that is stored in the node chart. A parser typically determines whether a syntax rule can be applied to the records currently in the node chart. If a syntax rule succeeds, the parser creates a new record. Each record, thus, corresponds to a sub-tree that may potentially be part of the full-sentence syntax parse tree. When a node that encompasses all the words of the input sentence is promoted to the node chart, then the tree represented by the node is a full-sentence parse of the input sentence.

The parser can conduct an exhaustive search for all possible full-sentence syntax parse trees by continuously applying the syntax rules until no additional syntax rules can be applied. The parser can also use various heuristic or statistical approaches to guide the application of syntax rules so that the rules that are most likely to result in a full-sentence syntax parse tree are applied first. After one or a few full-sentence syntax parse trees are generated, the parser typically can terminate the search because the syntax parse tree most likely to be chosen as best representing the input is probably one of the first generated syntax parse trees.

Although such parsers can theoretically generate all possible syntax parse trees for an input sentence, they have the serious drawback that the complexity of the generated intermediate parse trees grows exponentially with the length of the input sentence being parsed. This exponential growth can quickly exceed memory and response time constraints for a particular application program that uses the parser. When memory or response time constraints have been exceeded, and parsing is stopped, the parser may have failed to produce a parse tree that spans all of the words in the input sentence. In particular, the parser may have failed to parse certain portions of the input. Thus, the resulting parse tree is completely uninformative as to those portions that were not parsed.

In one parser, a process is used to determine the likelihood that a certain syntax rule, when applied to a partial parse of an input span, will produce a node that will be part of the correct parse for the input span. This approach is used to guide the search through the space of possible parses toward those constructions that have the highest likelihood of producing the best parse, by producing a goodness measure for each node produced. This parser implements a "pruning" process to reduce the parsing time of the conventional parser. By integrating the goodness measure concept into the conventional parser, this parser reduces the time needed to parse the sentence by performing a non-exhaustive parse.

In conventional parsers, the mechanism by which nodes are added to the node chart involves a candidate list. A new node is produced by the application of a syntax rule to the nodes already in the node chart and is placed on the candidate list. In one pruning parser, the newly created node is assigned a goodness measure as it is placed on the candidate list. When it is time to promote a new node to the node chart, the candidate list is searched for the node with the highest goodness measure. That node is promoted to the node chart and used, along with neighboring nodes and the syntax rules, to generate additional nodes for the candidate list. Thus, the parsing time is reduced by early processing of nodes with high likelihoods of producing the best parse. This pruning process increases the likelihood that the best parse will be generated before the non-exhaustive parse is ended.

Two basic problems are faced by any node chart parser: generating a complete parse tree quickly, and generating the correct parse. The first problem consists of the time and resource constraints any practical system must impose on the search for the correct parse. Any parser could simply generate all possible parses, then use a goodness measure to choose the best parse, but this approach will consume an impractical amount of memory for the node chart and time for the parse. Thus, a non-exhaustive search of the space of possible parses for a sentence is needed, preferably one that minimizes the number of newly created nodes.

The other problem consists of actually generating and identifying the correct parse. Even given exhaustive parsing, there is no guaranteed way of identifying the correct parse. With pruning of the search space (i.e., implementing shortcuts to reduce parse time), many possible parses are never even generated. Conventional parsers guide the search generally in the direction of the correct parse, but the correct parse is not necessarily the first parse found. Due to time and resource constraints, parsing continues for only a limited period after the first parse is found. If the first parse is not the correct parse, there is no guarantee that the correct parse will be found within the limited amount of additional searching.

Therefore, there is a need for an improved natural language parser that searches the space of possible parses and maximizes the probability of finding the correct parse, and does so quickly by building as few nodes as possible.

SUMMARY OF THE INVENTION

The present invention satisfies the above-described needs by providing a method for making natural language parsers more accurate and efficient. The present invention utilizes a template set to reduce the time required to produce an accurate and complete parse tree. The present invention uses the template set to identify parse conditions having certain predefined characteristics. When such a parse condition is identified, the parser implements a responsive action associated with the particular template used to identify the parse condition. The responsive action redirects the parsing process to reduce processing time and increase the accuracy of the parse tree output. The responsive action is tailored to economize the parse process in light of the current state of the parse process and the history of the parse process leading to the current state. This on-the-fly redirection of the parse process permits the parser to assemble critical portions of the complete parse tree early in the parse process, thus reducing the overall time needed to parse an input span.

In one aspect of the present invention, a Highest Likelihood Span (HLS) parsing procedure is provided for focusing a natural language parser. The HLS procedure determines the portion of the input span that is most likely to contain a node that will be a constituent of the correct complete parse. Focusing is done by analyzing the current state or condition of the parse and the history leading to that state, at every stage of the parsing procedure. Additionally, in certain cases, constructions that are very likely to be part of the correct parse may be identified at an early stage in the parsing procedure. In this early-parsing procedure, nodes that have a high probability of being part of the correct complete parse should be promoted to the node chart early in the parsing process.

By controlling the selection of the portion of the span to parse next, the HLS parser reduces the time needed to perform a complete parse. The HLS parser is comprised of a growth stage and an adjustment stage. The growth stage utilizes a grow node to facilitate right-to-left parsing. The adjustment stage is invoked when the growth stage is unable to proceed in a right-to-left manner for any reason. The adjustment stage utilizes a set of templates to identify the reason for which the growth stage was unable to proceed. When the reason is identified, the adjustment stage utilizes a responsive action to realign the parser so that the growth stage can be re-invoked to generate the correct complete parse.

In another aspect of the present invention, current parse conditions are compared to a set of templates. If the current parse conditions match one of the templates then the responsive action associated with the template is implemented. Selective candidate promotion adjustment templates identify parse states in which the grow node could be grown further, if a particular node were promoted from a candidate list to a node chart. In order to reach the adjustment stage, the growth stage must have failed because no syntax rule has been able to combine the grow node with any other node directly to its left (in the input span) to produce a candidate node. Often this situation exists because the node representing the highest-likelihood part of speech of the word immediately to the left of a grow node is the wrong part of speech in the context of that particular input. Because only the highest-likelihood part of speech for each word in the input span is promoted to the chart at the start of the parse, leftward growth can be blocked if the highest-likelihood part of speech cannot be combined with the grow node. A responsive action to a match with a selective candidate promotion adjustment template includes the promotion of a node from the candidate list to the node chart that will permit further leftward growth.

Reanchoring adjustment templates identify parse states in which growth needs to be re-directed to focus on a new portion of the input span. This is accomplished by moving an anchor point to the left. The anchor point is moved to a point that is most likely, in light of the current parse state, to be the right-most end of a candidate node that is part of the correct parse. By re-starting the leftward directed growth stage at the new anchor point, the parser can be re-directed to focus on a more productive portion of the input span.

A pending-join adjustment template is another type of adjustment template used by the present invention. A record, called the pending-join state, is kept of the type and attributes of the last adjustment made in the adjustment stage of the parsing process. When another adjustment becomes necessary, pending-join adjustment templates look for particular, predefined combinations of the pending-join state and the current parse state (parse condition). When the predefined combinations are identified by a template, a specific candidate node in a candidate list is identified as the best candidate. After the best candidate has been identified, the pending-join state is reset and the growth stage is resumed. The growth stage is focused on growing the best candidate node leftward. Thus, the pending-join adjustment template optimizes the performance of the growth stage by identifying the best candidate node that will generate the complete correct parse tree most efficiently.

If another adjustment template cannot be invoked in the adjustment stage, a default template can be invoked. The present invention performs an associated responsive action for the default template. One such responsive action is to move the anchor point to the immediate left of the grow node, and set the grow node to none.

The various aspects of the present invention may be more clearly understood and appreciated from a review of the following detailed description of the disclosed embodiments and by reference to the drawings and claims.

BRIEF DESCRIPTION OF THE DRAWINGS

FIG. 2 is a block diagram illustrating the interaction between the major components employed by a natural language parser.

FIG. 5 is a state table depicting the operation of a conventional natural language parser.

FIG. 7 is a state table depicting the operation of an embodiment of the present invention.

FIG. 9 is a state table depicting the operation of an embodiment of the present invention.

FIG. 10 is a state table depicting the operation of an embodiment of the present invention.

FIG. 11 is a state table depicting the operation of an embodiment of the present invention.

FIG. 12 is a state table depicting the operation of an embodiment of the present invention.

DETAILED DESCRIPTION

In an exemplary embodiment of the present invention, an improved natural language parser is provided for accepting as input a span of natural language text and providing as output a parse tree. When the parser successfully parses an input span, the parse tree represents the words of the input span in a format that permits a grammatical critique of the sentence. For example, a complete parse tree may identify the correct part of speech of each word in the span and may identify a sentence construction for the entire input span. The sentence construction represented by the parse may indicate the syntactic relationship of words or phrases in the span to other words or phrases in the span. For example, the sentence construction may identify an adjective phrase that modifies a word that is identified as a noun.

An exhaustive parse of a span will usually result in the creation of at least one parse tree that accurately represents the input span. However, an exhaustive parse is usually unavailable, because system resource constraints or time consumption constraints are prohibitive of an exhaustive parse. Therefore, shortcuts are typically implemented to provide an efficient and yet accurate parse of an input span.

In one embodiment of the present invention, a natural language parser uses a template set to reduce the time required to produce an accurate and complete parse tree. The parser uses the template set to identify parse conditions having certain predefined characteristics. When such a parse condition is identified, the parser implements a responsive action associated with the template. The responsive action redirects the parsing process to reduce processing time and increase the accuracy of the parse tree output. The responsive action is tailored to economize the parse process in light of the current state of the parse process and the history of the parse process leading to the current state. This on-the-fly redirection of the parse process permits the parser to assemble critical portions of the complete parse tree early in the parse process, thus reducing the time needed to parse an input span.

An Exemplary Operating Environment

Figure 1:
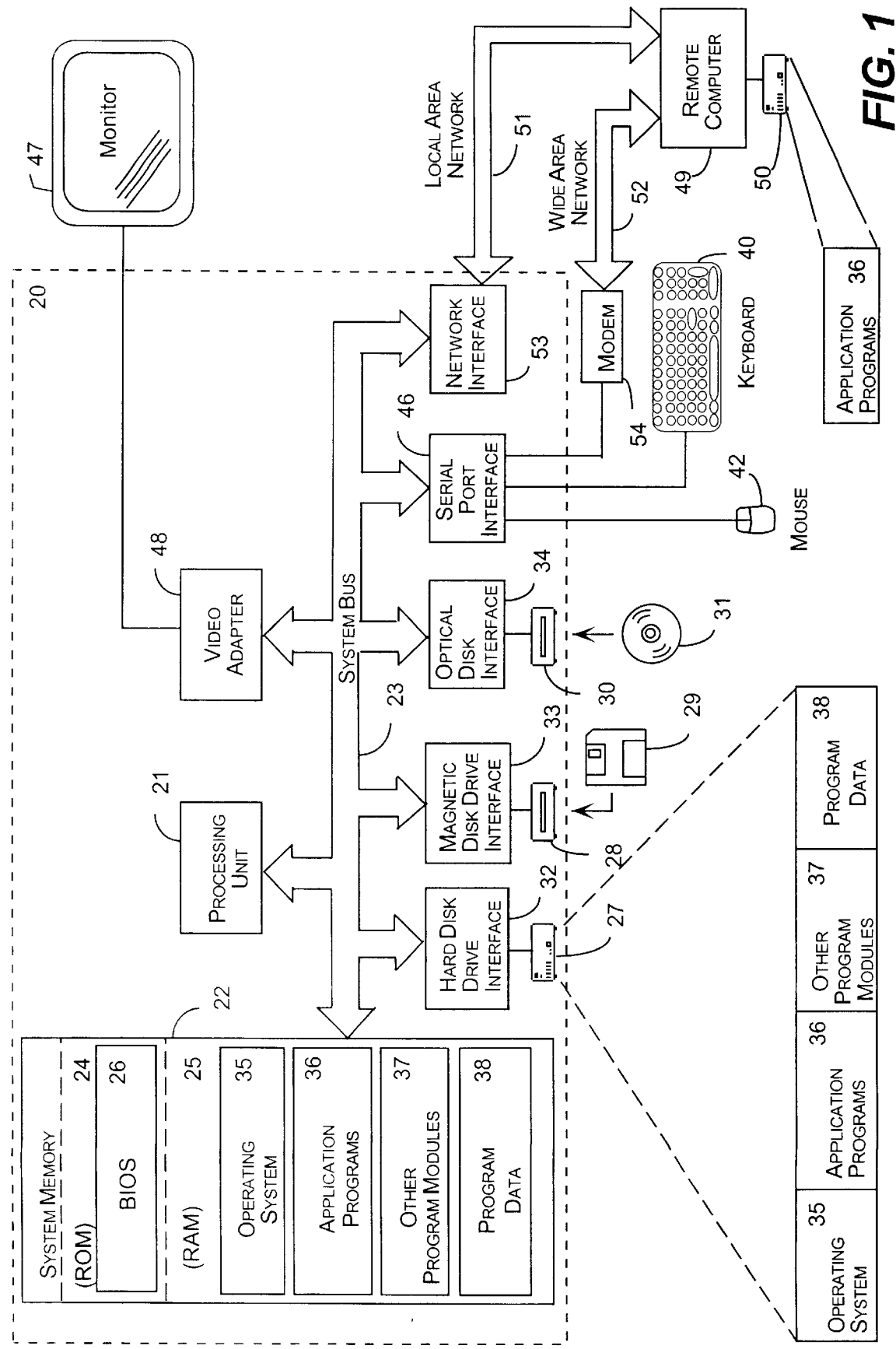
FIG. 1 is a block diagram of a personal computer that provides the operating environment for an embodiment of the present invention.

FIG. 1 and the following discussion are intended to provide a brief, general description of a suitable computing environment in which the invention may be implemented. Although the present invention is described as a stand-alone process, those skilled in the art will recognize that the invention may be implemented in combination with other program modules or as a part of a larger program module. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules and data files may be stored in the drives and RAM 25, including an operating system 35, one or more application programs 36, a natural language parser 37, a template set 38, and a lexicon 39. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

A Natural Language Parser

As stated above, a natural language parser is a program that takes a span (e.g., a sentence) of natural language text as input and produces as output for that input span a data structure, usually called a parse tree. A parse tree typically represents the syntactic relationships between the words and phrases in the input span.

Natural language parsers have traditionally been rule-based. Such rule-based parsers store knowledge about the syntactic structure of a natural language in the form of syntax rules, and apply these rules to the input span to obtain the resulting parse tree. The parser usually stores information about individual words, such as the parts-of-speech each word can represent, in a dictionary or "lexicon." The lexicon may be accessed by the parser for each word in the input span, prior to applying the syntax rules. For the purposes of the following discussion, TABLE 1, below, sets forth abbreviations used to represent parts-of-speech in an exemplary lexicon and TABLE 2 sets forth abbreviations used to represent phrases.

TABLE 1

| Part of Speech | Abbreviation |
| --- | --- |
| Noun | NOUN |
| Verb | VERB |
| Adjective | ADJ |
| Adverb | ADV |
| Preposition | PREP |
| Pronoun | PRON |
| Conjunction | CONJ |

TABLE 2

| Phrase | Abbreviation |
| --- | --- |
| Noun Phrase | NP |
| Verb Phrase | VP |
| Adjective Phrase | AJP |
| Adverb Phrase | AVP |
| Preposition Phrase | PP |
| Complement Clause | COMPCL |
| Subjunctive Clause | SUBJCL |
| Past Participle Clause | PTPRTCL |
| Conjunctive Phrase | CONJP |

To generate a parse tree, a typical parser first creates one or more leaf nodes for each word of the input span. Each leaf node indicates a possible part of speech of the word. For example, the word "part" can be used as a noun or a verb part-of-speech. A leaf node is created for the word "part" as a noun, and another leaf node is created for the word "part" as a verb. The parser then applies the syntax rules to generate intermediate-level nodes linked to one, two, or occasionally more existing nodes. Intermediate-level nodes are also referred to as phrases, despite the fact that they may only contain a single word from the input span. Assuming that the parse is successful, the parser will ultimately generate a single node for a complete syntax parse tree that encompasses the entire span (i.e., one leaf node for each word of the input span).

As mentioned above, a parser attempts to apply syntax rules one-at-a-time to single nodes, to pairs of nodes, and, occasionally, to larger groups of nodes. If a syntax rule specifies that two certain types of nodes can be combined (joined) into a new intermediate-level node and a pair of adjacent nodes match that specification, then the parser applies the syntax rule to the adjacent nodes and creates an intermediate-level node representing the syntactic construct of the rule.

Conventional syntax rules comprise a specification and a condition. The specification indicates that certain types of syntactic constructs can be combined to form a new syntactic construct (e.g., "VP=NP+VP"). The conditions, if any, specify criteria that need to be satisfied before the syntax rule can succeed (e.g., plural agreement of the NP and the VP). For example, the words "he see" represent an NP and a VP, respectively. These words will satisfy the specification of the syntax rule given above and can be potentially combined into the higher-level syntactic construct of a VP. The specification of "VP=NP+VP" indicates that an intermediate-level VP node linked to the two nodes representing "he" and "see" can be created (i.e., he see (VP)=he (NP)+see (VP)).

However, the syntax rule may have a condition which indicates that the NP and VP need to be in agreement as to number (singular or plural). In this example, "he" is singular and "see" is plural. Therefore, "he" and "see" are not in plural agreement and the syntax rule does not succeed. If a syntax rule succeeds, a new node is created and becomes part of the total set of nodes to which the syntax rules are applied. The process of applying syntax rules to the growing set of nodes continues until a full-sentence syntax parse tree is generated. A full-sentence syntax par includes all of the words of the input as nodes and represents one possible parse of the input.

Referring now to FIG. 2, a conventional parser 200 is depicted in block diagram form. A candidate list 208 is shown with leaf nodes representing each of the words of the input span 202 as well as the parts of speech associated with each word. The associated parts of speech are determined by looking the words up in a dictionary or lexicon (not shown). Other nodes are created by applying syntax rules (not shown) to the existing nodes in a node chart 204. The node chart 204 of a conventional parser 200 is a data structure used to track the existing nodes 206a–206u that have been created during the parse process. As the parse process proceeds, nodes are "promoted" (moved) from the candidate list 208 to the node chart 204. Each promoted node 206a–206u is represented by a record stored in the node chart 204. In this example, leaf nodes and intermediate-level nodes are shown in the candidate list 208, despite the fact that they have been moved to the node chart 204 and constitute nodes 206a–206l. Collectively, the node chart 204 and the candidate list 208 contain all of the nodes that have been created at any given point in the parse process.

Generally, the parser 200 determines which nodes are to be promoted to the node chart 204 by evaluating the nodes in the candidate list 208. As each new node is generated by the application of a syntax rule to existing nodes 206a–206u, the new node is placed on the candidate list 208. Each node in the candidate list 208 is associated with a goodness measure which represents the probability that the particular node will be a component of the completed parse tree. When it is time to promote a new node to the node chart, the candidate list 208 is searched for the node with the highest goodness measure. That node is promoted to the node chart and used, along with neighboring nodes and the syntax rules, to create additional nodes for the candidate list 208.

The parser 200 typically determines whether each of a set of syntax rules can be applied to combine the existing nodes 206a–206u in the node chart 204 with a newly promoted node. If a syntax rule can be applied, then the parser 200 applies the condition of the syntax rule to the components of the nodes 206a–206u affected by the syntax rule. If the syntax rule conditions are satisfied by the affected nodes, then the syntax rule succeeds and the parser 200 creates a new node and stores it in the candidate list 208. Each node 206a–206u, thus, contains a sub-parse-tree that may ultimately be determined to be part of the full input span 202 parse tree. When a node (e.g., node 206u) that encompasses all the words of the input span 202 is promoted to the node chart 204, then the parse tree represented by the all-encompassing node is a complete parse of the input span 202.

Figure 3:
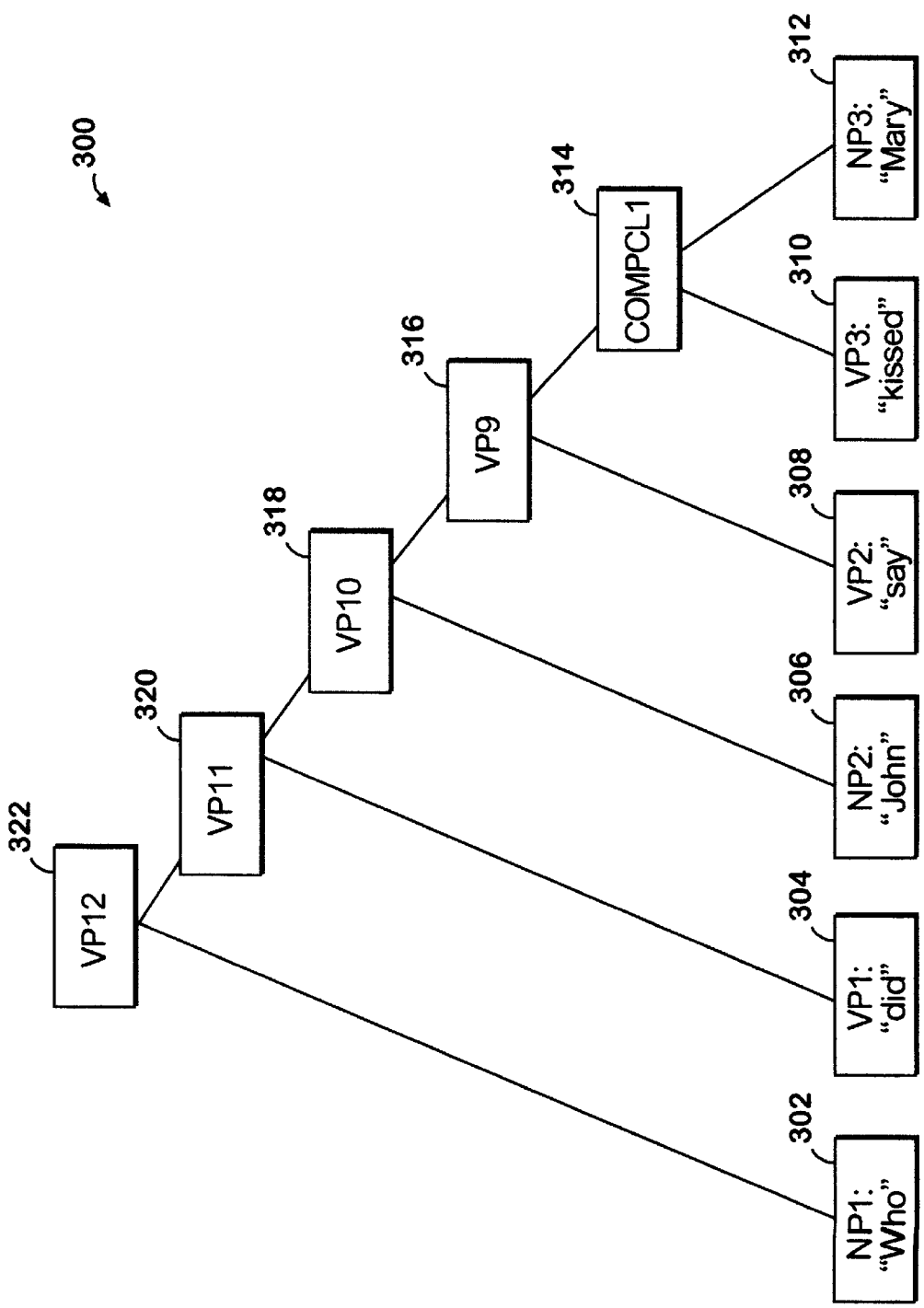
FIG. 3 is a block diagram of an exemplary parse tree.

Referring now to FIG. 3, a block diagram depicts a complete, correct parse tree 300 of the input span: "Who did John say kissed Mary?" A first node 302 contains the word "Who" and its part of speech, NP1. The "1" indicates that this node is the first NP node encountered by the parser. A second node 304 contains the word "did" and its part of speech, VP1. A third node 306 contains the word "John" and its part of speech, NP2. The "2" indicates that this node is the second NP node encountered by the parser. A fourth node 308 contains the word "say" and its part of speech, VP2. A fifth node 310 contains the word "kissed" and its part of speech, VP3. A sixth node 312 contains the word "Mary" and its part of speech, NP3.

In this parse tree 300, the fifth node 310 and the sixth node 312 have been joined, by virtue of having satisfied a syntax rule, to form a seventh node 314. The seventh node 314, thus contains the words "kissed" and "Mary" and their phrase type, COMPCL1. Likewise, the fourth node 308 and the seventh node 314 have been joined (by satisfying a syntax rule) and form an eighth node 316. The eighth node 316, thus contains the words "say", "kissed", and "Mary" and their collective part of speech, VP9. Similarly, the third node 306 and the eighth node 316 form a ninth node 318; the second node 304 and the ninth node 318 form a tenth node 320; and the first node 302 and the tenth node 320 form an eleventh node 322. The resulting parse tree 300 contains all of the words of the input span with their associated parts of speech and represents the syntactic relationships between the words and phrases in the input span.

The parser can conduct an exhaustive search for all possible full-sentence syntax parse trees by continuously applying syntax rules until no additional syntax rules can be applied. The parser can also use various heuristic or statistical approaches to guide the application of syntax rules so that the syntax rules that are most likely to result in a full-sentence syntax parse tree are applied first. Using such approaches, after one or a few full-sentence syntax parse trees are generated, the parser typically can terminate the search because the syntax parse tree most likely to be chosen as best representing the input is probably one of the first generated syntax parse trees. If no full-sentence syntax parse trees are generated after a reasonable search, then a fitted parse can be achieved by combining the most promising sub-trees together into a single tree using a root node that is generated by the application of a special aggregation rule.

Various means of stopping the parsing process will support the implementation of an exemplary embodiment of the present invention. Thus, for the purposes of this description, the stopping means will be referred to as an "end of parse condition." The end of parse condition may be the creation of the first full span parse, the creation of every possible full span parse, or the consumption of a predefined level of system resources or time.

A Method for Parsing Natural Language Using Directed Search Templates

Figure 4:
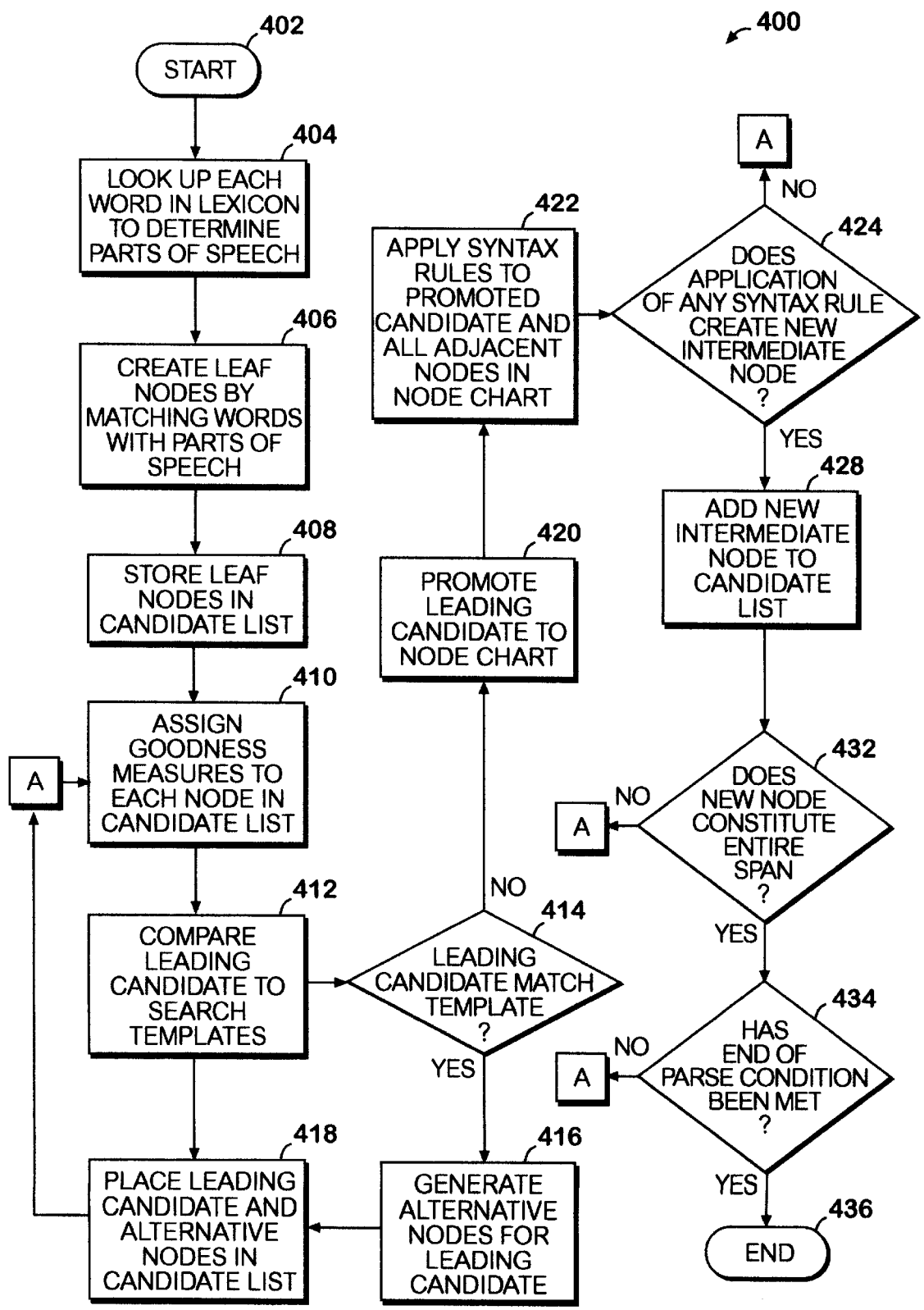
FIG. 4 is a flowchart illustrating the method of operation of a natural language parser with directed search capabilities.

FIG. 4 depicts an exemplary method of a natural language parser. Like the parser described in connection with FIG. 2, this method utilizes the data structures of the candidate list and node chart to generate a parse tree from the input span. The method 400 starts at step 402 and proceeds to step 404. At step 404, the parser looks up each word in the lexicon to determine the part of speech associated with each word. As discussed in connection with FIG. 2, the lexicon typically contains the parts-of-speech for which each word in the natural language can be used. Therefore, when a word is looked up in the lexicon, more than one result may be returned and more than one leaf node may be created for any given word.

The method then proceeds to step 406, wherein leaf nodes are created by matching the words with the associated parts-of-speech. Specifically, for each word and part of speech pair returned by step 404, a leaf node is created. The method then proceeds to step 408 and the leaf nodes are stored in the candidate list as depicted in FIG. 2. The method then proceeds to step 410 and a goodness measure is assigned to each of the nodes in the candidate list. As discussed in connection with FIG. 2, the goodness measure represents the probability that a particular node will be a component of the completed parse tree. It will be appreciated that various means of calculating a goodness measure are contemplated by the inventor. One means of calculating a goodness measure is described in a co-pending U.S. patent application Ser. No. 08/896,557, entitled "Method and System for Natural Language Parsing Using Chunking," filed on Jul. 17, 1997 and assigned to Microsoft Corporation. This U.S. patent application is incorporated herein by reference. For the purposes of this discussion, it is sufficient to assume that the goodness measure identifies nodes that are the most likely components of the accurately parsed input span.

The method next proceeds to step 412 and the leading candidate in the candidate list is compared to directed search templates. The directed search templates identify problematic nodes, for which alternative parses may have a higher likelihood of being part of the correct parse. A natural language parser that utilizes directed search templates is described in a co-pending U.S. patent application with U.S Ser. No. 09/103,057 entitled "An Improved Natural Language Parser," filed on Jul. 23, 1998 and assigned to Microsoft Corporation. This U.S. patent application is incorporated herein by reference. The method proceeds to decision block 414, where a determination is made as to whether there is a match between the leading candidate and a search template. If there is a match, then the leading candidate is a problematic node and the method branches to step 416 and generates alternative nodes for the leading candidate.

The alternative nodes generated at step 416 represent constructions that are acceptable alternatives to the problematic leading candidate. The method then proceeds to step 418 and places the leading candidate and the alternative nodes in the candidate list. When all of the newly created alternative nodes have been placed in the candidate list, the method proceeds to step 410 and assigns a goodness measure to each node in the candidate list. Of course, in an alternative embodiment, only those nodes that have not already been assigned a goodness measure will be assigned a goodness measure at this second (or subsequent) implementation of step 410.

Returning now to decision block 414, when the leading candidate does not match any of the templates (i.e., it is not problematic), the method need not apply the directed search templates and branches to step 420. At step 420, the leading candidate is promoted to the node chart.

The method then proceeds to step 422 and the syntax rules are applied to the promoted node and all adjacent nodes in the node chart. Specifically, the promoted node is compared to the specification portion of the syntax rules until a match is found. When a match is found, then the other nodes in the node chart are compared to the specification until a match is found. When all of the specifications of a particular syntax rule are met, then the syntax rule is "triggered."

A triggered syntax rule will combine adjacent nodes into a single node if all of the syntax rule's conditions (if any) are met. When nodes are combined to create a new node, the new nodes are referred to as intermediate-level nodes. At decision block 424, a determination is made as to whether the application of any syntax rule has created a new intermediate-level node. If no new node has been created, then the method branches back to step 410 (via connector A) and assigns goodness measures to each node in the candidate list. Of course, if all of the nodes in the candidate list have already been assigned goodness measures, then this step may be skipped. If, at decision block 424, a determination is made that a new intermediate-level node has been created, then the method branches to step 428 and the new intermediate-level node is added to the candidate list.

The method then proceeds to decision block 432 at which a decision is made as to whether the new node constitutes the entire input span. If the node constitutes the entire span, then it represents a possible complete parse and the method branches to decision block 434. At decision block 434 a determination is made as to whether the end of parse condition has been met. As discussed above, the end of parse condition may be any means of determining the end-point of the parsing process. If the end of parse condition has been met, then the method ends at step 436.

Returning to decision block 432, when the new node does not constitute an entire span, then the method branches to step 410 (via connector A) and the nodes in the candidate list are assigned goodness measures in order to determine the next leading candidate. Likewise, at decision block 434, when the end of parse condition has not been met, the method will branch to step 410 (via connector A) despite the creation of a full-span parse tree.

The above method will generate a full-span parse and will generate all possible parses of a span if the end of parse condition is so permissive. However, the above-described method may also generate incorrect parses. Often, these incorrect parses will be generated before the correct parse tree is generated. Moreover, the correct parse trees may never be generated prior to the satisfaction of the end of parse condition. In such a case, the output of the natural language parser will be an inaccurate parse tree. By identifying parse conditions having certain predefined characteristics, an exemplary embodiment of the present invention provides a means for making the parse process more efficient and accurate.

FIG. 5 illustrates an exemplary state table depicting the operation of a conventional natural language parser. More particularly, the state table represents the state of the node chart (i.e., a parse condition) after each iteration of promoting a leading candidate node to the node chart. As with FIGS. 2 and 3, the parser is shown processing the input span: "Who did John say kissed Mary?" The first column 502 represents the names of the nodes that have been promoted to the node chart. This name is formed by concatenating the node type (e.g., NP) with an instance number (e.g., the second NP formed will be named NP2). The second column 504 represents the goodness measure associated with each node. The third column 506 represents the text of the promoted node. The text is formatted to roughly correlate to its relative position in the input span. The fourth column 508 represents each node's constituent nodes, where applicable. For example, as discussed in connection with FIG. 3, the tenth node 320 (FIG. 3) has the second node 304 (FIG. 3) and the ninth node 318 (FIG. 3), as constituents. The tenth node is shown in FIG. 5 as being promoted to the node chart at state 552 and is represented by the VP11 node label. The fourth column 508 reveals the constituents of the tenth node, which are represented by the node labels VP1 ("did") and VP10 ("John say kissed Mary").

At the start of the conventional parse process the leaf nodes are promoted to the node chart. A leaf node is an individual word of the input span, coupled with its associated part of speech. State 554 illustrates the promotion of the first leaf node for the question mark character (CHAR1) that is found at the end of the input span. State 556 illustrates the promotion of the second leaf node for the word "Mary" (NOUN1). The promotion of leaf nodes continues until all parts of speech for all words have been promoted as leaf nodes. At state 555, the parser begins application of the syntax rules to the nodes already in the node chart.

Unary syntax rules are syntax rules that operate on a single node, rather than joining two or more nodes together. A unary syntax rule applies to the leaf node containing the pronoun part of speech for the word "Who" (PRON1). When the unary syntax rule is triggered, an intermediate-level node NP1, representing the noun phrase use of the PRON1 leaf node is created. The NP1 node is placed in the candidate list and is assigned a goodness measure of 0.99770. The goodness measures of all of the nodes in the candidate list are compared and the node with the highest goodness measure is identified as the best candidate and is promoted to the node chart. At state 558, the state table shows that the NP1 node is promoted to the node chart.

Syntax rules that combine (join) intermediate-level nodes operate like unary syntax rules. A syntax rule that combines the VP3 node ("kissed") and the NP3 node ("Mary") is triggered and creates a VP4 node ("kissed Mary"). The VP4 node is placed in the candidate list and has a goodness measure of 0.04498. Because this goodness measure is higher than that of any other node in the candidate list, the VP4 node is promoted to the node chart at state 560. Notably, the "kissed Mary" is also used to form the COMPCL1 node. However, because the VP4 node's goodness measure (0.04498) is higher than that of the COMPCL1 node (0.00923), the VP4 node is promoted to the node chart earlier in the parse process.

Nodes that are base parts of speech (i.e., not a phrase), such as the noun NOUN1, do not have constituents, because they are leaf nodes, not intermediate-level nodes. This format will be used for all state tables throughout the Figures. Each row in the state tables reflects the promoted node, its goodness measure, its contents, and its constituents at each particular iteration of the parser's promotion process.

The state table of FIG. 5 illustrates one of the basic problems leading to natural language parser inefficiency. For this input span, a successful parse requires that "kissed Mary" be a COMPCL construction. However, as shown at state 550, this construction does not have a high goodness measure (0.00923 out of a possible 1.0) as compared to the goodness measure of the VP4 construction (0.04498). Thus, a number of constructions are built first, although the first built constructions are not part of the correct parse. In fact, only five intermediate-level nodes are needed to accurately parse this input span, but 15 are actually built by the parser.

An approach is needed for creating the minimum number of nodes required to build the correct parse. In the case of the parse illustrated in FIG. 5, the number of created nodes could have been reduced if the parser had recognized that the COMPCL construction should have been created earlier in the parse. The Highest Likelihood Span (HLS) parser of an exemplary embodiment of the present invention is capable of identifying situations like that of FIG. 5. By implementing a responsive action, the HLS parser can minimize built nodes and reduce required parse times. A series of examples are useful for illustrating the identification and responsive action aspects of an exemplary embodiment of the present invention.

A Highest Likelihood Span Parser

As discussed above, the best parse of an input span can usually be generated by an exhaustive parse. However, an end-of-parse condition is a necessary means of economizing a parser's consumption of system resources. To economize, the parse must be pruned (shortened) to something less than an exhaustive parse. Unfortunately, pruning can reduce the accuracy of a natural language parser. By focusing (or directing) the parser, system resources can be economized, while maintaining an acceptable level of accuracy. Directed search templates can be used to guide the parse generally in the direction of the correct complete parse, but the parser still generates many nodes that are not part of the correct complete parse.

An exemplary embodiment of the present invention provides an HLS parsing procedure that focuses a natural language parser on the most promising nodes. The HLS procedure determines the portion of the input span that is most likely to contain a node that will be a constituent of the correct complete parse. Focusing is done by analyzing the current state of the parse and the history leading to that state, at every stage of the parsing procedure. Additionally, in certain cases, constructions that are very likely to be part of the correct parse may be identified early in the parsing procedure. In this early-parsing procedure, the underlying principle is the same as with HLS parsing generally, nodes that have a high probability of being part of the correct complete parse should be promoted to the node chart early in the parsing process.

By controlling the selection of the portion of the span to parse next, the HLS parser reduces the time needed to perform a complete parse. Generally, the HLS parser is comprised of a growth stage and an adjustment stage. The growth stage utilizes a grow node to facilitate right-to-left parsing. The adjustment stage is invoked when the growth stage is unable to proceed in a right-to-left manner for any reason. The adjustment stage utilizes a set of adjustment templates to identify the reason for which the growth stage was unable to proceed. When the reason is identified, the adjustment stage utilizes a responsive action to realign the parser so that the growth stage can be re-invoked to generate the correct complete parse.

In an exemplary embodiment of the present invention, several factors affect the selection of a candidate node to promote to the node chart from the candidate list. Factors that affect this selection process at each step of the HLS parse process include: the fact that English is a right-branching language; the ability to grow nodes from right to left; the node that is currently being grown from right to left; the candidates currently in the candidate list; the existing syntax rule probabilities and goodness measures; nodes recently promoted to the node chart; a template set for identifying parse conditions in which redirection can reduce parse time; and a template set for identifying problematic portions of input spans. The following series of examples will illustrate the way that these factors may affect the operation of an HLS parser. A flow chart illustrating an exemplary embodiment of the present invention will be described, following the discussion of the examples of HLS parsing.

Figure 6:
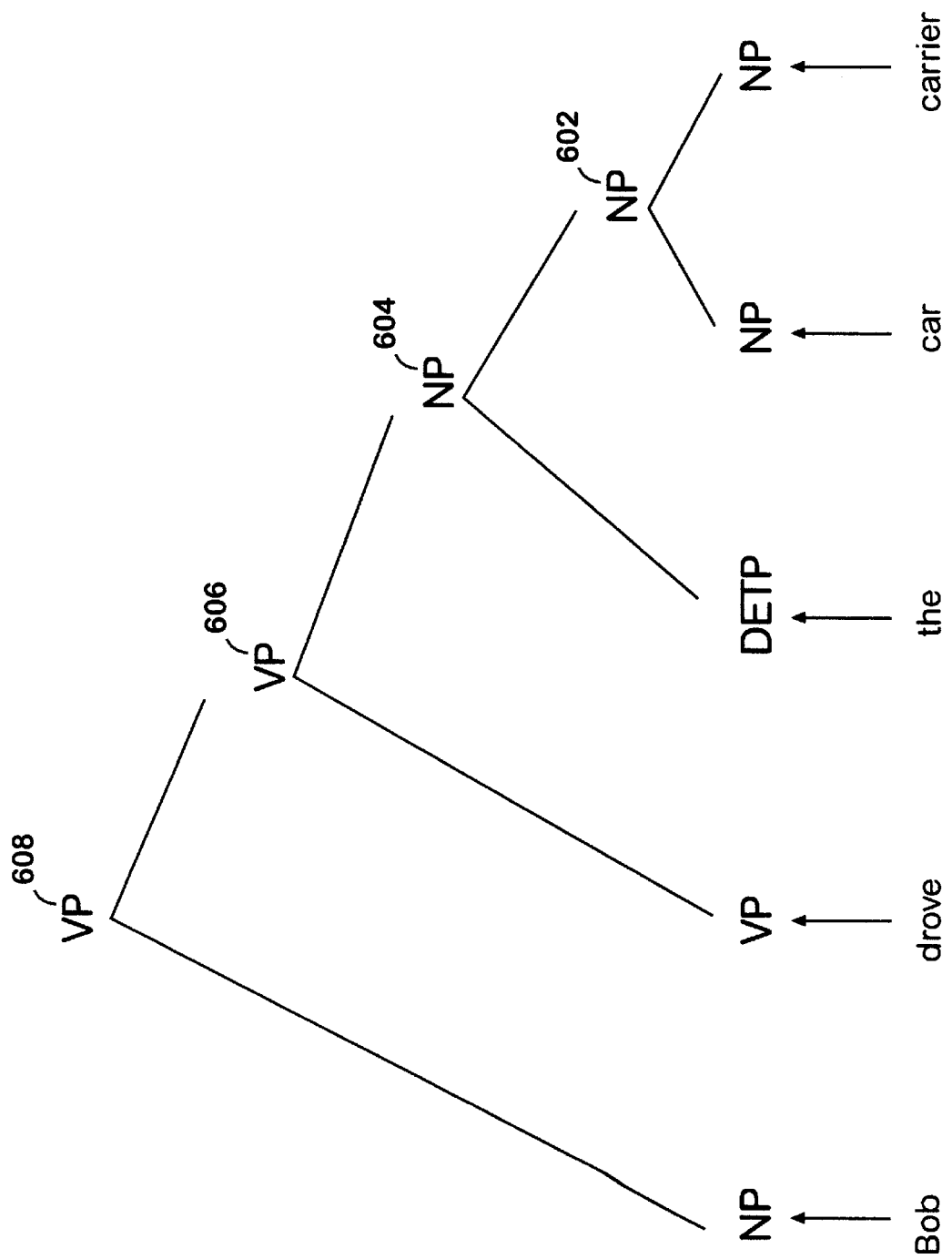
FIG. 6 is a block diagram of an exemplary parse tree.

FIG. 6 depicts a parse tree that provides a simple example of the value of HLS parsing in the context of a right-branching language. The input span is: "Bob drove the car carrier." Examined without regard to HLS parsing, even such a short sentence contains nodes that are not part of the correct parse, such as: "Bob drove," "the car", "drove the car," and "Bob drove the car."

HLS parsing exploits the fact that English is a right branching language. Accordingly, the last word of an English input span is highly likely to be the right end of a large constituent of the correct parse. As with conventional parsing procedure, all the most likely parts-of-speech of the input words are first promoted to the chart. In order to capitalize on the knowledge that English is a right-branching language, the HLS parser will next promote the NP "car carrier" node 602 to the chart. This promotion reflects the objective of trying to build the largest node having a right-most constituent (here, "carrier") at the end of the input span. Because this right to left parsing succeeds, the HLS parser continues trying to grow that node, building "the car carrier" 604, "drove the car carrier" 606, and "Bob drove the car carrier" 608. The "Bob drove the car carrier" node 608 is the complete, correct parse for the sentence, with the minimum number of nodes having been built. The minimum number of nodes was built in this case, because the HLS parser progressed in a right to left direction. Another direction would have resulted in the generation of nodes that are not constituents of the complete, correct parse.

Of course, most sentences are more complicated than this, and right-to-left parsing alone is not sufficient to minimize the creation of nodes for many input spans. There are several other ways, including, but not limited to, growing nodes right to left, in which HLS parsing maximizes the probability of choosing the candidate most likely to be part of the correct parse. However, this simple example serves to illustrate the foundation of HLS, that identifying the span of the input currently most likely to be part of the correct parse can improve the chances of choosing a node, for promotion to the node chart, that is part of the correct parse.

The Growth Stage

The HLS parser of an exemplary embodiment of the present invention is divided into a mandatory stage and an optional stage. The mandatory stage is the growth stage and the optional stage is the adjustment stage. In the growth stage, the HLS parser attempts to find an existing candidate in the candidate list that permits continued leftward growth of the node currently in the process of being grown. The node that is currently being grown at any given time is the grow node. The concept of the grow node is an abstraction used to characterize the focus of the HLS parser. The rightmost portion of the grow node is identified by the HLS parser as the "anchor point." Initially, the grow node will also be the rightmost portion of the input span. As will be discussed below, the anchor point (and, therefore, the grow node) will change in certain situations.

The HLS parser considers the candidate that is the largest extension to the left of the grow node to be the best candidate node. The grow node does not always exist; for example, there is no grow node at the start of parsing, or when reanchoring is performed, as described below. In the preferred implementation, when the grow node does exist, it is generally the last node that was promoted to the chart. Although another node can be promoted to the chart without changing the grow node when the HLS parser determines that adding another node might enable the grow node to grow further.

If the growth stage fails to permit continued node growth in the leftward direction, the HLS parser will invoke the adjustment stage. The adjustment stage adjusts the node chart or anchor point in order to permit further growth along the portion of the input span most likely to create a node that is part of the correct parse for the input span. The following description provides a simple example of the growth stage of the HLS parser, where the input span does not require the HLS parser to resort to use of the adjustment stage.

FIG. 7 is a state table depicting the operation of the HLS parser as it processes the input span considered in connection with FIGS. 2, 3, and 5: "Who did John say kissed Mary." One of the keys to HLS parsing is choosing the span most likely to contain a node that will be a constituent of the correct parse. It is certain that at least one such node will end at the last word of the input span, that being the node representing one of the parts of speech of the last word itself. Moreover, because English syntactic components are primarily right-branching, it is very likely that one or more larger constituents of the correct parse also end at the last word. FIG. 6 illustrates the case in which all five constituent nodes of the complete parse end at the last word of the input span. Thus, at the beginning of the parse, HLS always considers the highest-likelihood span to be the longest span that ends with the last word and for which there is currently a candidate node.

The example depicted in FIG. 7 represents the case of the general process of HLS candidate selection, in which the longest candidate (or candidates, in case of a tie) with a right end at the anchor point is considered the best candidate. The longest node is desired because it is a larger portion of the full-input parse than any other node under consideration. At the start of parsing, the anchor point is the rightmost word in the input. English is primarily a right-branching language, with most of the syntactic constituents and structural complexity down the right branch of the parse tree. The anchor point in an English language parse is the rightmost point of an input span that is most likely to be part of the correct parse at any given point in the parse. Thus, larger constituents can be incrementally grown to the left from the anchor point, creating new candidates with each iteration, as shown in FIG. 7. In a left-branching language, the anchor point would be the left end of the span, and constituents would be grown rightward. Thus, so long as larger nodes can be grown leftward from the anchor point, those are considered to be the nodes most likely to be part of the correct parse.

An HLS parser chooses candidates that end at the anchor point, and are at least as long as the grow node, if one exists, as the ones most likely to be the best candidate. Candidates equally as long as the grow node are acceptable, because unary syntax rules (syntax rules affecting only single nodes) may be triggered by such nodes. If there are multiple candidate nodes meeting these criteria, the longest node is chosen or other goodness measures are used to choose the best candidate.

In FIG. 7, the use of right-anchored, leftward growth by the HLS parser solves the problem of creating too many nodes, as described in connection with FIG. 5. The leftward direction of the growth stage is used to promote the COMPCL for "kissed Mary" to the chart quickly (at state 702), despite that node's low general probability (goodness measure) of being part of the correct parse. The desired COMPCL1 is not tried immediately—it is the third candidate promoted (after nodes 704 and 706) to the chart for the span "kissed Mary", but HLS keeps the search focused on the highest-likelihood span ending with the last word in the input so long as there are any such candidates. This focused approach causes COMPCL1 to be promoted despite its low goodness measure. Consequently, only seven intermediate-level nodes 702–716 are built, rather than the 15 intermediate nodes built without HLS, as depicted in the state table of FIG. 5. Because the HLS parser of FIG. 7 utilizes a leftward growth stage, the right-branching input span is parsed more quickly with fewer nodes created. In contrast, the parser of FIG. 5 would have promoted nodes strictly on the basis of goodness measure comparisons and would have generated more nodes that would not have been in the final parse.

As discussed above, the HLS parser utilizes a grow node to track leftward growth. Accordingly, at state 702, the grow node contains the COMPCL1 node ("kissed Mary"). At state 718, the grown node is grown leftward and contains the VP5 node ("say kissed Mary"). The HLS parser continues to grown the grow node leftward, until the grow node contains the VP8 node ("Who did John say kissed Mary) at state 720, which constitutes a complete parse of the input span (except for the question mark). As will be discussed below, input spans that are not completely right-branching will reset the contents of the grow node to "zero" and reset the anchor point. Because this input span was completely right-branching, the grow node was able to be continually grown leftward, through each iteration of the growth state of the parse process.

Once the HLS parser has chosen the best candidate node, that node is compared to the list of directed search templates, as discussed above. If the best candidate node matches any element of the directed search template, the candidate is left on the candidate list (rather than promoted to the chart). Nodes for all other constructions in that template are built and added to the candidate list, and the HLS evaluation process is repeated to choose the best candidate from the augmented candidate list. Finally, when the growth stage succeeds and the best candidate node is identified, that node is promoted to the chart, and the syntax rules are applied to generate any new resultant candidate nodes. Then the growth stage is started again, to choose the next candidate node to promote to the chart.

The first stage of the HLS parsing process, involves growing the grow node leftward as aggressively as possible, initially anchored at the rightmost input word. When the sentence is entirely right-branching, as in "Bob drove the car carrier," this is sufficient to construct the entire correct parse. However, most sentences are not entirely right-branching, or include other impediments to simple leftward growth, so the second stage of HLS parsing must generally be invoked during the course of a parse in order to reanchor the parse, put together larger constructions, or adjust the state of the parse to maneuver around obstacles.

The Adjustment Stage

When no candidate node exists that ends at the anchor point and is as long as or longer than the grow node, the growth stage has failed and the adjustment stage is entered. In the adjustment stage, the current state of the parse is compared to a set of templates, called adjustment templates. If a template is matched, the responsive action associated with the template is performed. The responsive action may involve promoting a specific candidate to the chart or changing the anchor point. If no adjustment template is matched, a special template, the default template, is invoked. After an adjustment template is matched and the associated responsive action performed, the growth stage is restarted in order to choose the next candidate node to promote to the node chart. The HLS parser of an exemplary embodiment of the present invention features three classes of adjustment templates: selective candidate promotion, reanchoring, and pending-join.

Selective Candidate Promotion Templates

Selective candidate promotion adjustment templates identify parse states in which the grow node could be grown further, if a particular node were promoted from the candidate list to the node chart. In order to reach the adjustment stage, the growth stage must have failed because no syntax rule has been able to combine the grow node with any other node directly to its left (in the input span) to produce a candidate node. Often this situation exists because the node representing the highest-likelihood part of speech of the word immediately to the left of the grow node is the wrong part of speech. That is, in the context of input span, the nodes do not satisfy the specifications and/or conditions of any syntax rule. Because only the highest-likelihood part of speech for each word in the input span is promoted to the chart at the start of the parse, leftward growth can be blocked if the highest-likelihood part of speech cannot be combined with the grow node.

Figure 8:
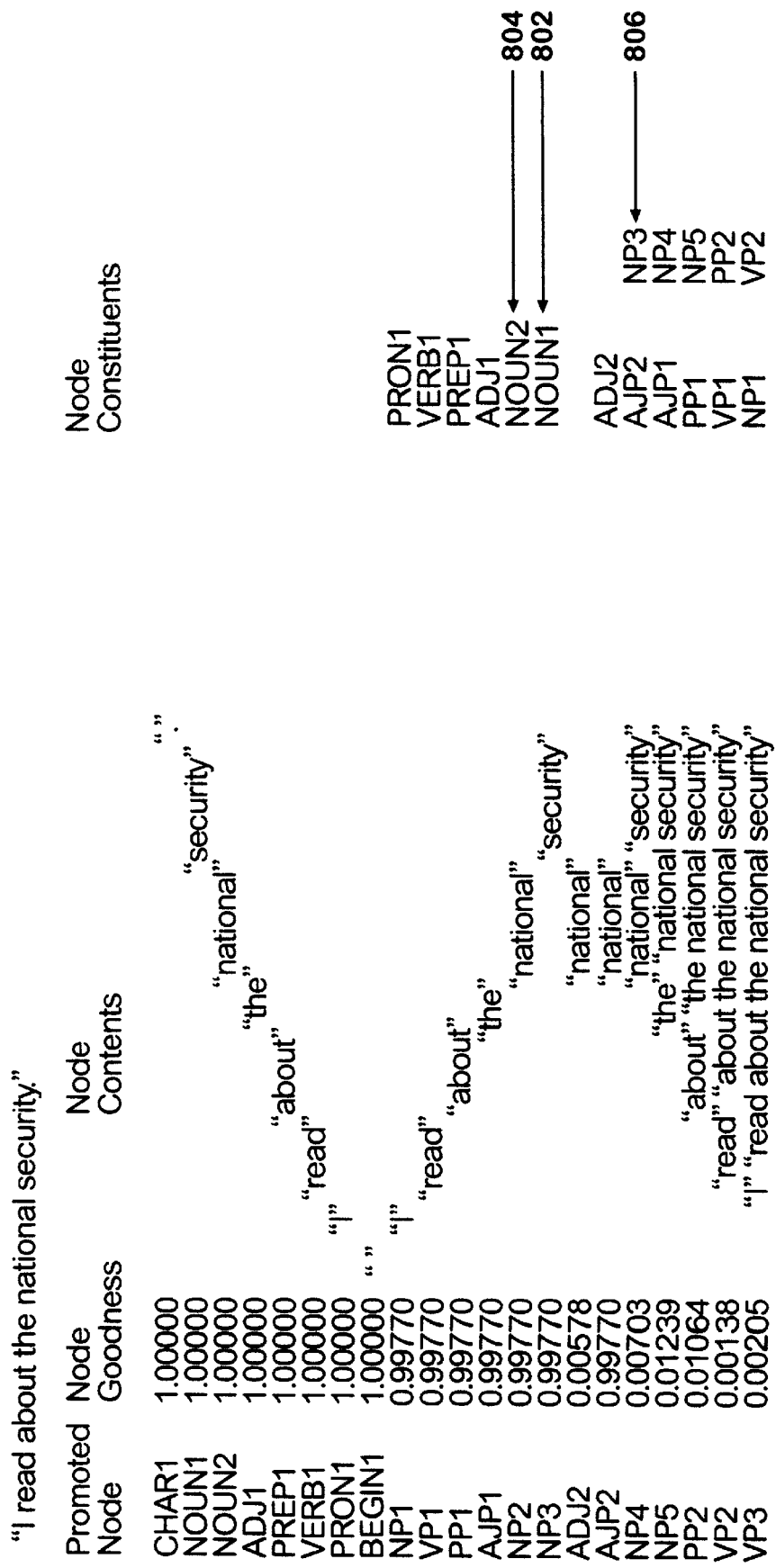
FIG. 8 is a state table depicting the operation of an embodiment of the present invention.

FIG. 8 is a state table that illustrates selective candidate promotion when parsing the input span, "I read about the national security." The noun part of speech for the last word in the input span, "security," is promoted to an NP at state 802. The NP3 node is the initial grow node, because it represents the right-most anchor point in the input span. The word to the left of the grow node in the input span is "national," for which the most likely part of speech is a noun. The noun part of speech of "national" is, therefore, promoted to the node chart as an NP at state 804, prior to the promotion of NP1. However, there is either no syntax rule that will conjoin these particular NPs (NP2 and NP3) or there is no candidate node that permits leftward growth of the grow node, so the HLS growth stage fails.

Because the growth stage fails, the parser must enter the adjustment stage. The parser, thus, compares the adjustment templates to the current state of the parse tree and the input span. In this example, the template having the following specifications is matched: the grow node is an NP, the next word to the left in the input span is an NP, but also has an adjective part of speech, and the next word to the left in the input span after that word is in the chart as a determiner AJP. When this template is matched, the following corresponding responsive action is taken: the adjective form of the word to the left of the grow node is promoted from the candidate list to the chart, and then the growth stage of HLS parsing is started again. In this example, the growth stage is restarted at state 806. There is a syntax rule that joins AJPs and NPs, so the grow node can now continue to be grown in the leftward direction and the rest of the input span can be parsed in a minimum number of steps. This example illustrates the implementation of one of the basic objectives of the adjustment stage of HLS parsing: if further extension of the grow node is blocked, try to identify the cause of the blockage, then correct it so that growth either of that node (as in the above case) or of a new node can occur.

Those skilled in the art will appreciate that although FIG. 8 illustrates promoting only alternative part of speech candidate nodes to the node chart, it is equally possible to promote any candidate node that may improve the likelihood of generating a constituent of the correct parse. Although the exemplary implementation described does not do so, it may also be desirable to be able to construct one or more candidate nodes that do not exist in the candidate list, so that those nodes may be promoted to the chart to allow the grow node to grow.

Reanchoring Adjustment Templates

Reanchoring adjustment templates identify parse states in which growth needs to be re-directed to focus on a new portion of the input span. This is accomplished by moving the anchor point to the left. That is, the anchor point is moved to the point that is most likely, in light of the current parse state, to be the right-most end of a candidate node that is part of the correct parse. By setting the grow node to "none" (i.e., the grow node contains no portion of the input span), and re-starting the growth stage at the new anchor point, the parser can be re-directed to focus on a more productive portion of the input span.

FIG. 9 illustrates reanchoring in the case of the input span, "I jumped when the dog saw the iguana." The VP "saw the iguana" is constructed at state 902, and then the VP "dog saw the iguana" is built at state 904 by joining "dog" with "saw the iguana." At this state in the parse, VP4, containing "dog saw the iguana" is the grow node and has an anchor point at the right-most point of the input span. However, this grow node cannot be grown any further, because there is no syntax rule that can join "the" with VP4. At this point (state 904), the growth stage has failed, so the adjustment stage is entered. The adjustment template set is searched and the template with the following specifications will be invoked: the grow node consists of a VP ("dog saw the iguana"), wherein the first word is a single-word NP ("dog"). The responsive action corresponding to this template requires setting the anchor point to the input span position of the single-word NP (here, "dog"), and setting the grow node to none. The growth stage of the HLS parser resumes, and leftward growth builds the node "the dog" at state 906. Unfortunately, leftward growth is again stopped and the adjustment stage must again be implemented. A pending-join adjustment template, described below, can be used to realign the parser to avoid this obstacle to leftward growth.

Those skilled in the art will appreciate that although this example uses only information about the grow node to make its decision, reanchoring can equally well use information about any node in the chart, and about any candidate in the candidate list.

Pending-Join Adjustment Templates

A pending-join adjustment template is a third type of adjustment template used by an exemplary embodiment of the present invention. A record, called the pending-join state, is kept of the type and attributes of the last adjustment made in the adjustment stage of the parsing process (i.e., the last adjustment template invoked). When another adjustment becomes necessary, pending-join adjustment templates look for particular, predefined combinations of the pending-join state and the current parse state. When the predefined combinations are identified by a pending-join adjustment template, a specific candidate is identified as the best candidate and is promoted to the node chart, without regard to goodness measure comparison. When this occurs, the pending-join state is set to none (i.e., no record is stored, until the next adjustment is made) and the growth stage is resumed.

Referring again to FIG. 9, the state table further illustrates implementation of the pending-join adjustment template in the case of the input span, "I jumped when the dog saw the iguana." When reanchoring is performed, as described above, the pending-join state is set to reflect the last adjustment, "reanchored to left of VP," and the location of the VP is recorded. After node NP5, containing "the dog", has been constructed at state 906 and the grow node cannot be grown any further, the growth stage has failed, and the search of the adjustment templates commences. The pending-join adjustment template with the following specification is invoked: "grow node is an NP, and the last adjustment was to reanchor to the left of a VP, and those nodes are adjacent." The associated responsive action is implemented, which is to find the candidate that joins the current NP (NP5) with the pending VP (VP3) and make it the best candidate. Here, that candidate is VP5 which is built and promoted to the node chart at state 908.

Those skilled in the art will appreciate that although the preferred implementation maintains only a one-deep pending-join history, any desired history depth could be maintained.

Default Templates

If no other adjustment template can be invoked in the adjustment stage, a default template is invoked. In an exemplary embodiment of the present invention, the associated responsive action for the default template is to move the anchor point to the immediate left of the grow node, and set the grow node to none.

FIG. 10 is a state table that illustrates the default adjustment template in the case of the input span, "It was injurious, neutral, or helpful to his cause." There is no syntax rule that can join the AJP "or helpful to his cause" with a comma to the left, so the growth stage fails at state 1002. If no adjustment template has a specification matching this parse state, then the adjustment stage would normally fail as well. Consequently, the default adjustment template is invoked, causing the anchor point to be moved to the position just to the left of the grow node (that is, to the comma's position), and the grow node to be set to none. The comma can then be joined with "neutral" to form the next grow node at state 1004. Of course, it will be appreciated that there may be other default template actions than the one employed in the preferred implementation.

Candidate promotion, reanchoring, pending-join, and default template processing by moving the anchor point to the left of the grow node are the adjustment mechanisms utilized by an exemplary embodiment of the present invention to economize the natural language parsing process. Those skilled in the art will appreciate that numerous other adjustment mechanisms may be implemented in the same way. The adjustment templates and associated responsive actions can be heuristically derived, by observation of cases in which the growth stage failed. However, templates and adjustments may also be statistically derived. One way in which this may be done is by performing the growth stage on a set of known parses, and applying machine learning techniques. Machine learning techniques enable the parser to empirically evaluate the conditions under which the growth stage fails and the responsive actions needed to allow the growth stage to continue. By collecting statistics on these known parses, these conditions can be identified and used to create templates with associated responsive actions.

Pending-Join Growth Template

A sub-process within the growth stage of an exemplary HLS parser can also be used to economize the parsing process. This sub-process is the pending-join growth template. Discussion of the pending-join growth template has been delayed until this point in the description, because its description requires an understanding of the adjustment stage. The pending-join growth template is similar to the pending-join adjustment template. The pending-join growth template is applied at each iteration of the growth stage. The pending-join growth template can be the first step performed in the candidate selection process. As described for the pending-join adjustment template, during HLS parsing, a record, called the pending-join state, is kept of the type and attributes of the last adjustment made in the parsing process. This pending-join state can be utilized in the growth stage as well as the adjustment stage.

Every time the HLS parser enters the growth stage, a check can be performed to see whether the grow node and the last record adjusted are adjacent. If they are and if they match the specifications of any of the pending-join growth templates, then the template is invoked. If a pending-join growth template is matched, a candidate node built from the combination of the grow node and the last record adjusted is chosen as the best candidate, is promoted, and becomes the new grow node. The anchor point is moved the to the right end of the new grow node, and the pending-join state is set to none.

FIG. 11 is a state table that illustrates a pending-join growth template utilized in the context of the input span, "He went to the store quickly." The node containing "quickly" cannot be grown to the left (at state 1102), so the anchor point is moved to "store." The parser records the fact that the last grow node before reanchoring was "quickly," the sixth word. The grow node anchored at "store" grows to "the store" (at state 1104) and "to the store" (at state 1106) and finally the VP "went to the store" is added to the chart (at state 1108). At the start of the next iteration of the growth stage, the pending-join growth mechanism observes that the VP that was just added is adjacent to the AVP that was the last segment adjusted, and searches the list of pending-join growth templates and finds the sequence "VP AVP." The candidate node containing that VP AVP sequence is then made the best candidate, and the anchor point is moved to the right end of the new grow node (at state 1110).

In an exemplary embodiment of the present invention, when the grow node reaches the left end of the input span, and no further adjustments can be made, the anchor point is set to the position of the last word in the input, the grow node is set to none, and HLS parsing continues normally. This process is repeated until either system resources are exhausted or a complete parse is found. If a complete parse is found and sufficient resources remain, HLS parsing continues for a certain number of iterations after the first parse in case the first parse found is not the correct one. If multiple parses are produced, the parse with the highest goodness measure is chosen.

Failing to produce a parse quickly might indicate that the particular sentence being parsed contains one or more constructions that are not considered very probable by the HLS implementation, so an alternative search approach might be more productive. Those skilled in the art will appreciate that there may be other approaches which combine HLS and non-HLS parsing approaches, for example by starting out with HLS parsing, and switching to non-HLS parsing if HLS parsing has not produced a parse within a certain number of iterations or complete right-to-left passes.

Pre-parse Processing

Another component of an exemplary embodiment of the present invention is pre-parse processing. Pre-parse processing takes place before the normal HLS parsing loop (described below) begins. One objective of pre-parse processing is to examine the words of the input span, identify certain sequences that have a very high likelihood of becoming constituents of the correct parse, and cause those constituents to be built and placed in the chart immediately after the nodes for the highest-probability parts of speech of the input words are placed in the chart. The nodes constructed by pre-parse processing are nodes that would, if not constructed in advance, tend to disrupt the smooth leftward growth of the grow node in HLS processing.

FIG. 12 illustrates pre-parse processing in the case of the input span, "The very small dog saw the iguana." The sequence determiner-adverb-adjective-noun ("the very small dog") is very like to become an NP, but this sequence does not grow smoothly to the left, because "very small," rather than "small dog," is a constituent of "very small dog." Thus, pre-parse processing matches the sequence determiner-adverb-adjective-noun with a pre-parse template, and adds the node "very small" to the node chart at the beginning of the parse (here, at state 1202), immediately after the highest-probability parts of speech for the words are added. The node for "The very small dog" is then constructed smoothly by HLS at state 1204. As this case demonstrates, one objective of pre-parse processing is the identification and construction in advance of certain nodes that are not strictly right-branching, and hence, nodes for which normal HLS processing is not as efficient.

A Method of Highest Likelihood Span Parsing

Figure 13A:
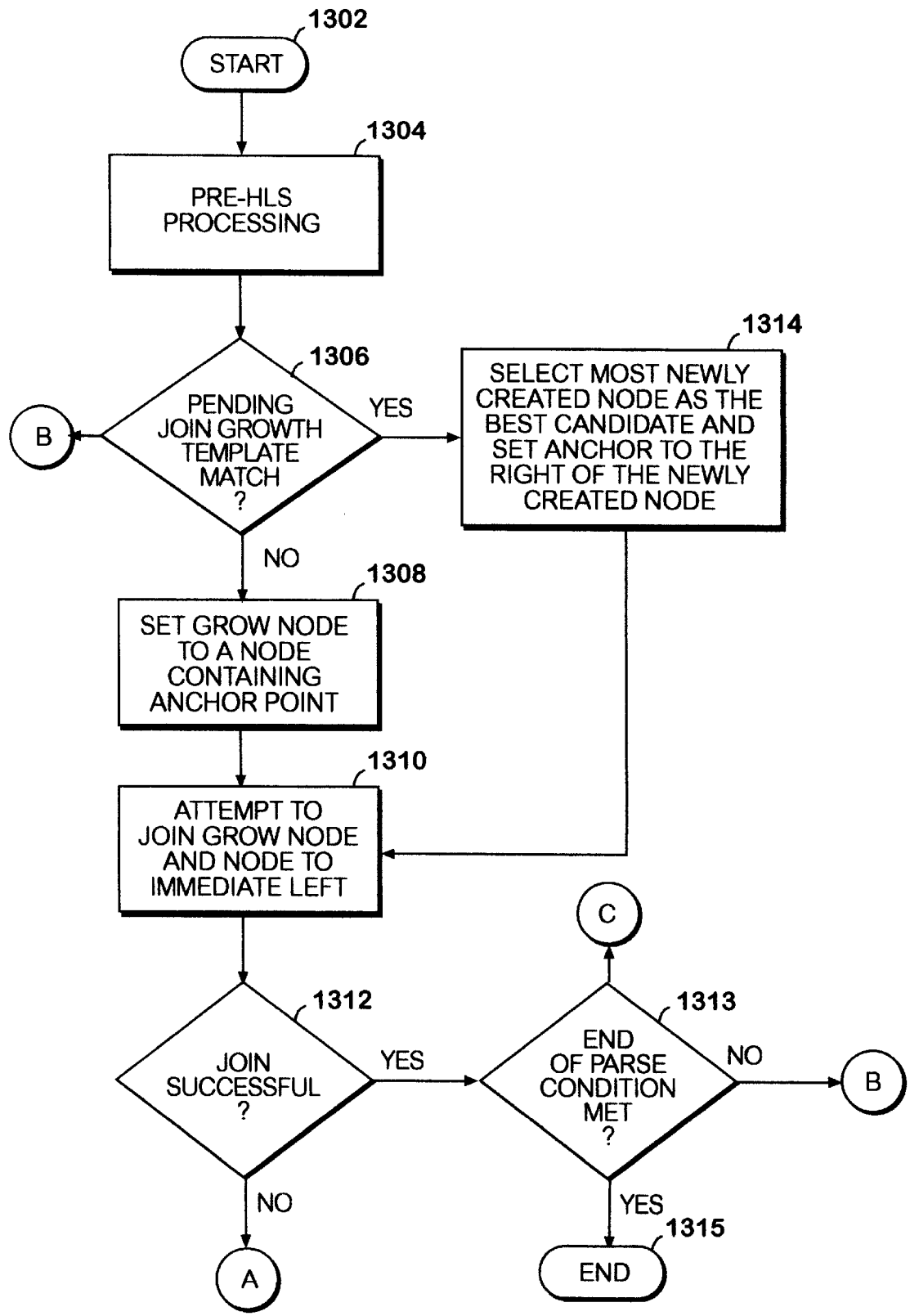
FIG. 13a is a flowchart illustrating the method of operation of an embodiment of the present invention.
Figure 13B:
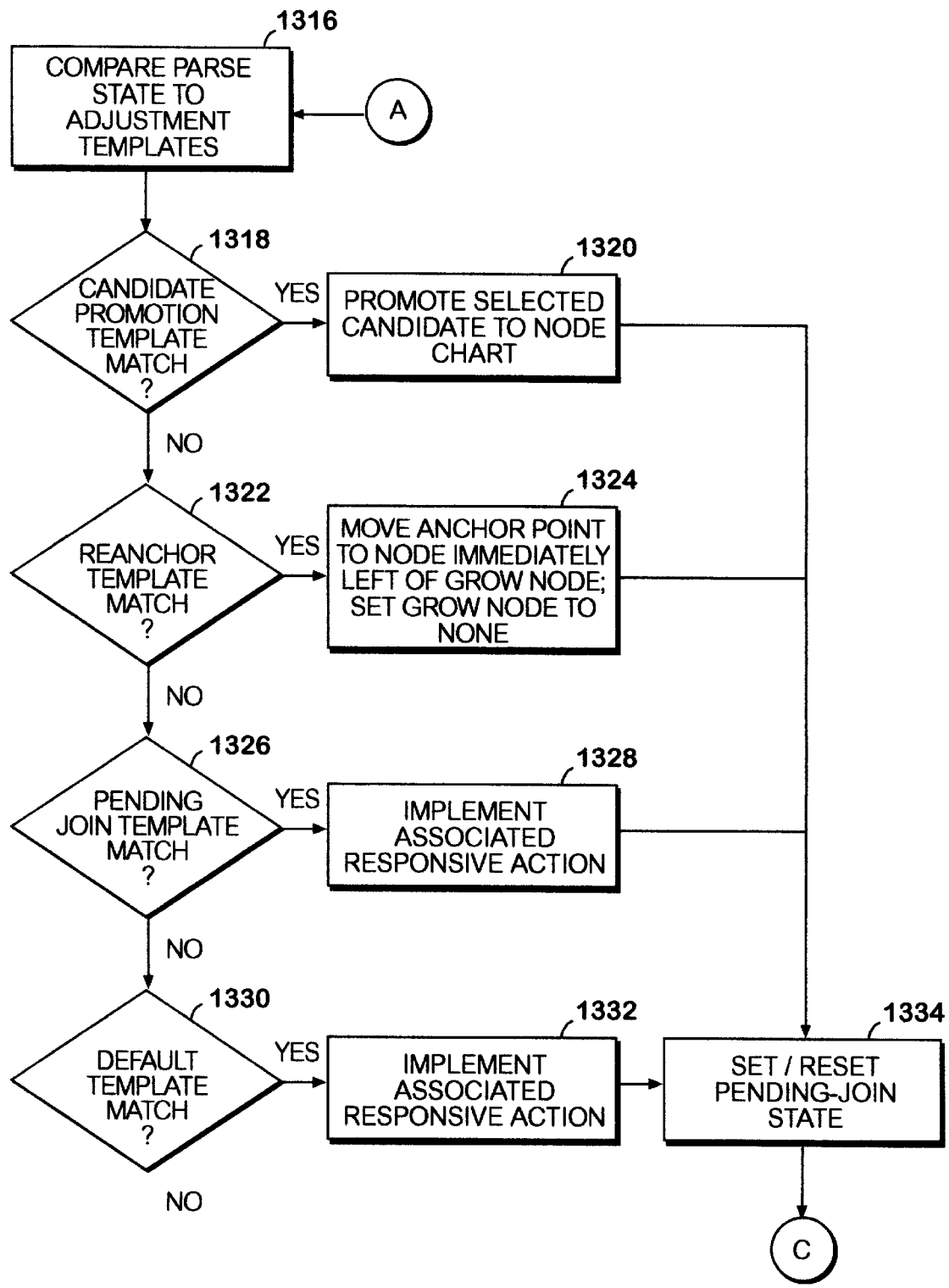
FIG. 13b is a flowchart illustrating the method of operation of an embodiment of the present invention.

The above described examples provide a basis for understanding the need for and the implementation of an HLS parser. FIGS. 13a and 13b are portions of a single flowchart that describes a method of an exemplary embodiment of the present invention. Although an exemplary embodiment of the present invention will incorporate many of the steps described in connection with FIG. 4, the discussion of some of those steps is omitted from the following description of HLS processing for simplicity. However, those skilled in the art will appreciate that many of the steps described in connection with FIG. 4 are incorporated in the HLS parser.

Referring now to FIG. 13a, the method starts at step 1302 and proceeds to step 1304. At step 1304, the pre-parse processing is performed on the input span and any nodes matching a pre-parse template are promoted to the node chart. The method then proceeds to decision block 1306 and the pending-join growth template set is compared to the current parse conditions to search for a match. If a match is found, then the method branches to step 1314 wherein the most newly created node is selected as the best candidate node and the anchor point is set to the right of the newly created node. In this case, the most newly created node will be the node that was built in response to the match of the pending-join growth template. If, on the other hand, a match is not found at decision block 1306, then the method branches to step 1308. At step 1308, the grow node is set to a node that contains the anchor point. Initially, the grow node will contain the right-most portion of the input span, but may change to another portion of the input span at a later iteration.

The method proceeds to step 1310 and an attempt is made to join the grow node and an adjacent node to the left of the grow node (in the input span). The method then proceeds to decision block 1312 where the attempt is evaluated. If the attempt to join was successful, then the method branches to step 1313, wherein a determination is made as to whether the end of parse condition has been satisfied. If the end of parse condition has been satisfied, then the method branches to step 1315, and the method ends the parsing process. If the end of parse condition has not been met, then the method branches to step 1306, via the "B" connectors.

If, at decision block 1312, the join is unsuccessful, then the method branches to step 1316 of FIG. 13b, via the "A" connectors. At step 1316, the current state of the parse (i.e., the parse conditions) is compared to the adjustment templates. This step marks the transition of the method from the growth stage to the adjustment stage. The method proceeds to decision block 1318, wherein a determination is made as to whether a candidate promotion template has been matched to the parse conditions.

If, at decision block 1318 the determination is that a match has been made, then the method branches to step 1320. At step 1320, the candidate node selected in accordance with the candidate promotion template is promoted to the node chart.

If, at decision block 1318, no candidate promotion templates match, then the method branches from decision block 1318 to decision block 1322. At decision block 1322, a determination is made as to whether a reanchor adjustment template matches the parse conditions. If a match is made, then the method branches to step 1324. At step 1324, the anchor point is moved to the node immediately to the left of the grow node and the grow node is set to none.

If, at decision block 1322, no candidate promotion templates match, then the method branches from decision block 1322 to decision block 1326. At decision block 1326, a determination is made as to whether a pending-join adjustment template matches the parse conditions. If a match is made, then the method branches to step 1328. At step 1328, the method implements the responsive action associated with the matched template.

If, at decision block 1326, no pending-join adjustment templates match, then the method branches from decision block 1326 to decision block 1330. At decision block 1330, a determination is made as to whether a default template matches the parse conditions. If a match is made, then the method branches to step 1332. At step 1332, the method implements the responsive action associated with the matched default template.

The method branches from steps 1320, 1324, 1328, and 1332 to step 1334. At step 1334, the pending-join state is set or reset. In the even that a match is made with a candidate promotion template, a reanchor adjustment template, or a default template, then the pending-join state is set to reflect the adjustment made. If a match is made with the pending-join adjustment template, then the pending-join state is reset. The method then proceeds to decision block 1313, via the "C" connectors. At step 1313, a determination is made as to whether the end of parse condition has been met. Usually, however, an adjustment will almost never signal the end of the parse, because the adjustment is typically made to assist the growth stage, rather than an end in itself.

Those skilled in the art will appreciate that the template matching process can be done in any order without departing from the spirit and scope of the present invention. The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

I claim:

1. A method of parsing a natural language input span, the method comprising the steps of:

breaking the input span into individual words;
looking up each individual word in a lexicon to determine at least one part of speech associated with the word;
storing each individual word and an associated part of speech as a node in a candidate list;
assigning a goodness measure to each node in the candidate list;
setting an anchor point to a right-most portion of the input span;
creating a grow node that contains the anchor point;
promoting the grow node to a node chart;
determining whether the grow node and a first node satisfy a syntax rule;
if the grow node and the first node do not satisfy the syntax rule, comparing a parse condition to a first template; and
if the parse condition and the first template match, performing a first responsive action associated with the first template.

2. The method of claim 1, further comprising the steps of:
comparing the input span to a pre-parse template; and
if the pre-parse template and the input span match, performing a second responsive action associated with the pre-parse template.

3. The method of claim 2, wherein the second responsive action comprises the creation of a constituent node.

4. The method of claim 3, wherein the second responsive action further comprises the promotion of the constituent node to the node chart.

5. The method of claim 1, wherein the parse condition comprises the current state of the node chart.

6. The method of claim 1, wherein the parse condition comprises the current state of the candidate list.

7. The method of claim 1, wherein the parse condition comprises the current state of the input span.

8. The method of claim 1, wherein the parse condition comprises a record of a last adjustment template invoked.

9. The method of claim 1, wherein the grow node contains a first portion of the input span and a second node contains a second portion of the input span and is located immediately to the left of the grow node and the grow node and the second node are joined to form a new grow node.

10. The method of claim 1, wherein the first responsive action comprises promoting a third node to the node chart.

11. The method of claim 1, wherein the first responsive action comprises setting the anchor point to a second portion of the input span that is not the right-most portion of the input span.

12. The method of claim 11, wherein the second portion of the input span is located immediately to the left of a node previously containing the anchor point.

13. The method of claim 11, wherein the first responsive action further comprises setting the grow node to none.

14. The method of claim 1, wherein the first responsive action comprises determining the status of a pending-join state.

15. A computer readable medium on which is stored computer-executable instructions for performing the steps of:
breaking an input span into a plurality of words;
associating each word with a part of speech;
storing each word and each associated part of speech as a leaf node;
creating a grow node that contains a right-most portion of the input span;
growing the grow node leftward;
if the grow node cannot be grown leftward, comparing a parse condition to a first template; and
if the parse condition and the first template match, performing a first responsive action.

16. The computer readable medium of claim 15, further comprising the steps of:
comparing the input span to a pre-parse template; and
if the pre-parse template and the input span match, performing a second responsive action associated with the pre-parse template.

17. The computer readable medium of claim 16, wherein the second responsive action comprises the creation of a constituent node.

18. The computer readable medium of claim 17, wherein the second responsive action further comprises the promotion of the constituent node to the node chart.

19. The computer readable medium of claim 15, wherein the parse condition comprises the current state of a node chart.

20. The computer readable medium of claim 15, wherein the parse condition comprises the current state of a candidate list.

21. The computer readable medium of claim 15, wherein the parse condition comprises the current state of an input span.

22. The computer readable medium of claim 15, wherein the parse condition comprises a record of a last adjustment template invoked.

23. The computer readable medium of claim 15, wherein the first responsive action comprises promoting a third node to a node chart.

24. The computer readable medium of claim 15, wherein the first responsive action comprises setting the grow node to contain a portion of the input span that is not a right-most portion of the input span.

25. The computer readable medium of claim 24, wherein the first responsive action further comprises setting a grow node to none.

26. The computer readable medium of claim 15, wherein the first responsive action comprises determining the status of a pending-join state.

27. A method of increasing efficiency of a natural language parser for parsing an input span, the method comprising the steps of:
creating a grow node that contains a right-most portion of the input span;
growing the grow node leftward;
if the grow node cannot be grown leftward, comparing a parse condition to a template; and
if the parse condition and the template match, performing a first responsive action.

28. The method of claim 27, wherein the parse condition comprises the current state of a node chart.

29. The method of claim 27, wherein the parse condition comprises the current state of a candidate list.

30. The method of claim 27, wherein the parse condition comprises the current state of the input span.

31. The method of claim 27, wherein the parse condition comprises a record of a last adjustment template invoked.

32. The method of claim 27, wherein the responsive action comprises promoting a third node to the node chart.

33. The method of claim 27, wherein the responsive action comprises setting the grow node to contain a first portion of the input span that is not a right-most portion of the input span.

34. The method of claim 33, wherein the first portion of the input span is located immediately to the left of a node previously contained in the grow node.

35. The method of claim 33, wherein the responsive action further comprises setting a grow node to none.

36. The method of claim 27, wherein the first responsive action comprises determining the status of a pending-join state.

* * * * *